Dec. 21, 1926.　　　　　　　　　　　　　　　　　　　1,611,515
G. S. CROWN
FLYTRAP AND BUG CATCHER
Filed July 29, 1926　　　　2 Sheets-Sheet 2
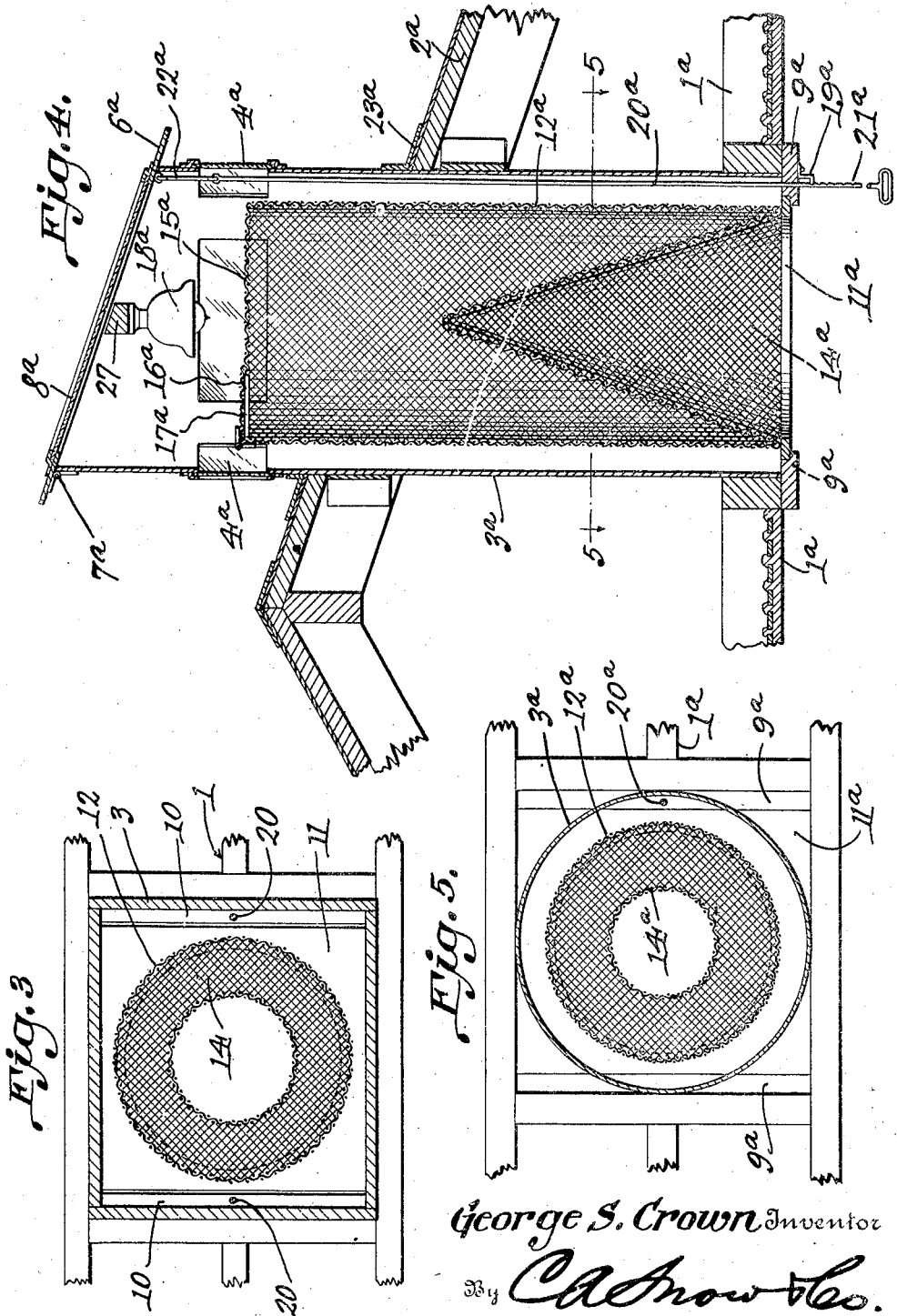
George S. Crown Inventor Patented Dec. 21, 1926.

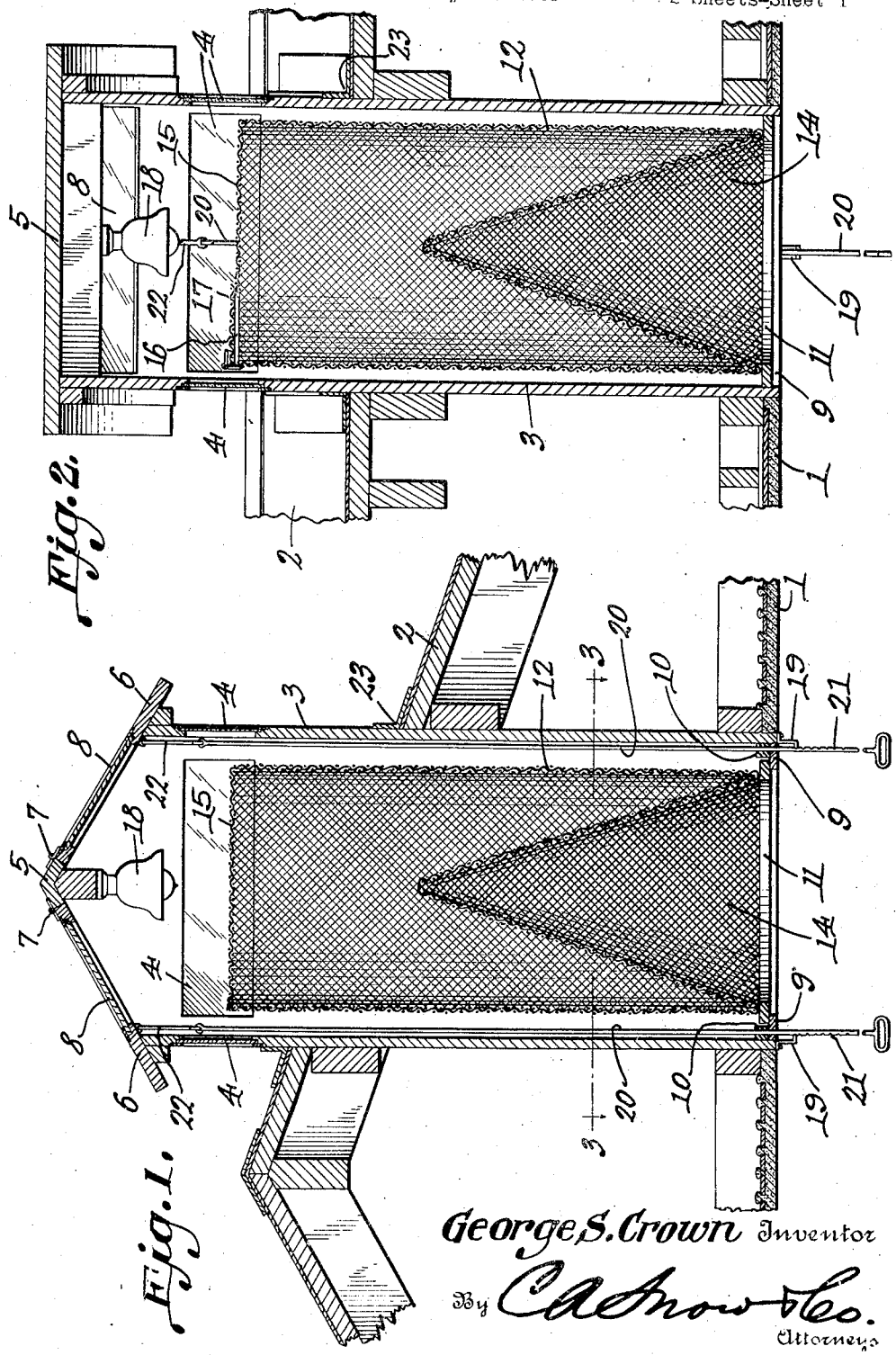

1,611,515

UNITED STATES PATENT OFFICE.

GEORGE S. CROWN, OF BAKERSFIELD, CALIFORNIA.

FLYTRAP AND BUG CATCHER.

Application filed July 29, 1926. Serial No. 125,767.

This invention aims to provide novel means for trapping insects and the like which are attracted by a light.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in longitudinal section, a device constructed in accordance with the invention;

Figure 2 is a longitudinal section wherein the cutting plane is located at right angles to the cutting plane in Figure 1;

Figure 3 is a cross section on the line 3—3 of Figure 1;

Figure 4 is a longitudinal section showing a modification;

Figure 5 is a cross section on the line 5—5 of Figure 4.

In Figures 1, 2 and 3, the numeral 1 marks the ceiling of a building, the roof appearing at 2. The casing 3 extends through the ceiling 1 and the roof 2. The casing 3 is provided, externally of the roof, with glass panels 4. At its top, the casing 3 has a ridge pole 5 whereunto lids 6 are hinged as shown at 7, the lids carrying glass panels 8.

Along two opposite sides of the casing 3, at the lower end thereof, extend cleats 9 surmounted by stop strips 10. On the cleats 9 is supported a hollow frame 11. The stop strips 10 limit the lateral movement of the frame 11. Because the cleats 9 extend along two of the sides of the casing 3 only, the frame 11 can be tilted at an angle, moved upwardly between the cleats 9 and then be brought to horizontal position on the cleats 9. The frame 11 serves to support a fly trap which may be made up of a tubular body 12 and a cone-shaped member 14 connected to the lower end of the body, the body being provided with a top 15 having an opening 16 controlled by a hinged lid 17. A lamp 18, which may be an electric lamp, is supported from the ridge pole 5 and is located above the fly trap. The lamp 18 may be extinguished or ignited, as occasion may demand. Ordinarily, the lamp 18 is used only at night and may be an electric lamp.

Keepers 19 are secured to the lower end of the casing 3. Operating members, such as rods 20, slide in the cleats 9 and in the stop strips 10 and are supplied with notches or seats 21, the rods 20 being resilient enough so that the notches 21 may be engaged with the keeper 19. At their upper ends, the operating members 20 are pivoted to links 22 which, in their turn, are pivoted to the lids 6.

In practical operation, when the parts are arranged as shown in Figure 1, the insects, attracted by the light proceeding through the panels 4 or 8, or by the light from the lamp 18, pass upwardly through the member 14, into the body 12 of the trap and are caught. The frame 14 may be tilted and removed downwardly between the cleats 9, and then the fly traps may be removed downwardly, the flies or other insects being killed, in any suitable way, and being dumped out through the opening 16 in the fly trap, when the lid 17 is opened.

Should the operator desire, the lids 6 may be raised by means of the operating member 20, and, then, a draft will be created through the casing 3, which will aid in attracting or drawing the insects toward the device and into the fly trap. The casing 3 is surrounded by the usual collar 23, which, cooperating with the roof 2, prevents leakage where the casing 3 passes through the roof.

In Figures 4 and 5, parts hereinbefore described have been designated by numerals previously used, with the suffix "a".

The modification embodies providing the casing $3^a$ with a single lid $6^a$ and a single operating rod $20^a$. The lid has a glass panel $8^a$ and is hingedly mounted as shown at $7^a$. The lamp $18^a$ is carried by a bar 27. The casing $3^a$ is circular in cross section and the frame cannot be manipulated as described hereinbefore in connection with the frame 11. The frame $11^a$ is slid to place horizontally on supporting bars $9^a$ mounted on the ceiling $1^a$.

What is claimed is:—

1. The combination with the roof of a building, of a casing extended through the roof, an insect trap insertible into the casing from the lower end thereof, means for supporting the trap removably in the casing, and means for illuminating the casing at a point adjacent to the top of the trap.

2. The combination with the roof of a building, of a casing extended through the roof, an insect trap insertible into the casing from the lower end thereof, means for supporting the trap removably in the casing, means for illuminating the casing at a point adjacent to the top of the trap, a movable lid on the upper end of the casing, and means for moving the lid to open and closed positions, said means being accessible from a point at the lower end of the casing.

In testimony that I claim the foregoing as my own, I have hereto affixed my signature.

GEORGE S. CROWN.